Jan. 15, 1924.

C. LE G. FORTESCUE 1,480,714

SYSTEM OF DISTRIBUTION

Filed Sept. 1, 1921

WITNESSES:
J.T. Wurmb.
W.R. Coley

INVENTOR
Charles LeG. Fortescue.
BY
Wesley G. Carr
ATTORNEY

Patented Jan. 15, 1924.

1,480,714

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF DISTRIBUTION.

Application filed September 1, 1921. Serial No. 497,755.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Systems of Distribution, of which the following is a specification.

My invention relates to systems of distribution and it has special relation to that type of system wherein electric energy at a constant potential may be converted to constant-current energy.

One object of my invention is to provide a relatively simple and extremely effective system embodying the principles of the well-known monocyclic square, whereby a constant value of alternating current may be obtained in a receiving circuit, for example, a welding system of the arc type.

More specifically stated, the object of my invention is to provide a plurality of inductive devices or coils which are so associated with a single condensive device and with the supply circuit and the receiving circuit as to constitute a resonant circuit and effect the desired conversion from constant-potential to constant-current energy.

Another object of my invention is to provide a magnetic or transformer structure for the above-mentioned inductive coils, whereby one set of coils may be adjusted in position with respect to another set, thus varying the mutual inductance between the sets of coils to vary the current in the welding circuit, as desired.

Other specific objects of my invention will become evident from the following detailed description taken in conjunction with the accompanying drawing, wherein—

Figure 1:
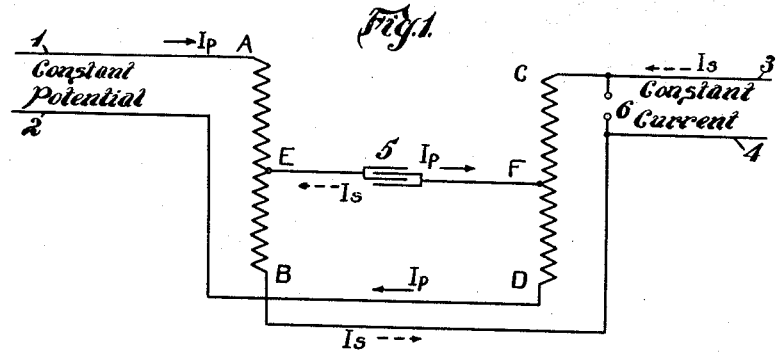
Figure 1 is a diagrammatic view of one form of a system of distribution embodying the principles of my present invention.

Referring to the drawing, the system shown in Fig. 1 comprises a constant-potential supply circuit comprising suitable conductors 1 and 2, a constant-current receiving circuit, such as a welding system, comprising suitable conductors 3 and 4, and a plurality of symmetrical reactive devices or coils AB and CD, the mid-points E and F of which are connected by a condensive device 5.

A spark gap or paper-puncture gap 6 is preferably provided in connection with the receiving circuit 3, 4 to further safeguard the welding operator.

In general, the illustrated arrangement of inductive and condensive devices follows the well-known principles of the monocyclic square, the arrangement and proportion of parts being such that the condensive device 5 constitutes a resonant circuit along with the half-portion AE of the one inductive device and the corresponding half-portion FD of the other inductive device. The illustrated arrangement, therefore, including the resonant circuit described, effects the desired conversion of electrical energy from a constant potential in the supply circuit 1, 2 to a constant current in the receiving or welding circuit 3, 4.

The path of the primary current $Ip$ for a given instant, as indicated by the solid arrows, extends from the supply-circuit conductor 1 through the half-portion AE of the one inductive device, the condensive device 5, half-portion FD of the other inductive device and thence to the remaining supply-circuit conductor 2.

The path of the secondary or constant current IS at a corresponding instant, as indicated by the dotted arrows, is established from the receiving-circuit conductor 3 through the half-portion CF of the second inductive device, the condensive device 5, half-portion EB of the first conductive device and thence to the remaining receiving-circuit conductor 4.

The two sets of coils AB and CD may be mounted on a common core, as set forth in detail below, while the condensive device 5 is preferably of the well known electrolytic type. The system will thus be, to a great extent, self-protecting and will also safeguard the operator by reason of the action of the electrolytic condensive device 5, but, if desired, additional protection for the operator may be employed in the form of the spark or paper-puncture gap 6.

Figure 2:
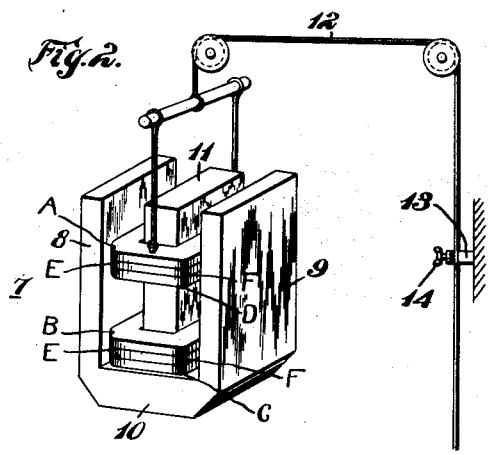
Fig. 2 is a view, partially in perspective and partially diagrammatic, of a magnetic or transformer structure including a plurality of coils organized and disposed in accordance with my invention.

The associated portions AE and FD of the reactive coils are preferably movably mounted symmetrically with respect to stationary portions BE and FC, as illustrated in Fig. 2. In this way, the mutual inductance of the two sets of coils AEFD and BEFC may be varied, as desired, without changing the self-inductance of the portions AE and FD. By means of this variation of mutual inductance between the primary and the secondary windings of the illustrated system, the constant current in the receiving or welding circuit may be adjusted to any desired value for holding a suitable arc at the point of welding.

The structure shown in Fig. 2 comprises an open-curcuit transformer 7 having a plurality of outer legs 8 and 9, which are joined by a suitable base member 10, and an intermediate core or leg 11, upon the free end of which the movable set of coils AE and FD is loosely wound.

The arrangement, in general, may be similar to that employed in the well-known constant-current transformer, as illustrated, whereby one coil may be manually rendered movable with respect to another and thus vary the mutual inductance of the two sets of coils without changing the self-inductance of the movable winding itself.

The illustrated structure for permitting such manual adjustment comprises a rope or cable 12, suitably secured to the movable coils, and a clamp 13, embodying a wing-nut 14, for retaining the coils in any desired position. It will be understood, however, that any other suitable arrangement may be provided.

The stationary coils BE and FC are wound around the base of the core or leg 11, as illustrated.

It will be appreciated that other structures may be employed, if desired, for effecting variation of the mutual inductance between a pair of coils without varying the self-inductance of the moving coil. For example, the two coils AE and FD may be wound stationary upon opposite ends of the core member 11, or its equivalent, while the coils BE and FC may be so placed around the same core as to be movable between the two stationary coils.

Figure 3:
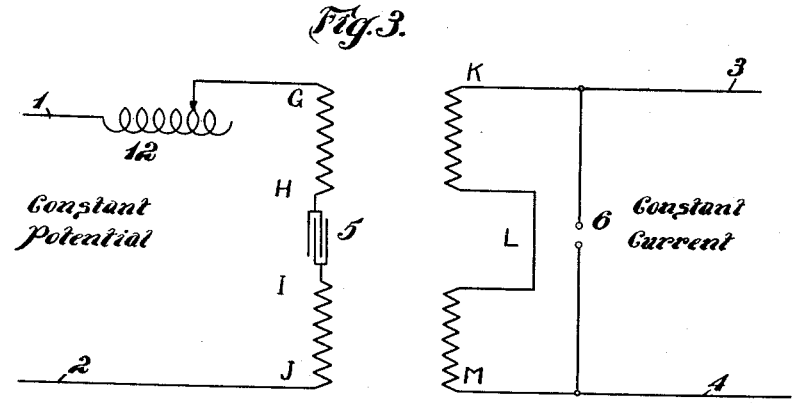
Fig. 3 is a diagrammatic view of a modification of the system that is shown in Fig. 1.

It may be desirable to isolate the receiving or working circuit from the supply circuit, in which case the system shown in Fig. 3 may be employed. The coils GH and IJ are equal primary coils of a suitable reactor, the condensive device 5 being connected between the two coils across the supply circuit 1, 2 and the proportion of parts being such that a resonant circuit is provided under open-circuit conditions.

KL and LM are similar coils connected in series relation across the receiving or working circuit 3, 4 and, thus form the secondary circuit of the system. The coils GH and IJ are preferably stationary, corresponding to the coils BE and FC of Fig. 2, while the coils KL and LM are adapted to be moved with respect to the stationary coils, in a manner similar to that illustrated in Fig. 2.

In this way, the value of current in the receiving or welding circut may be varied as desired.

The characteristics of the systems set forth are as follows:

(a) If the constant-current load is non-inductive, the supply current will be in phase with the impressed electromotive force;

(b) If the constant-current load is inductive the supply current will lead the supply electromotive force by the same angle as the receiving-circuit current lags behind the receiving-circuit terminal electromotive force. In other words, an inductive load in the receiving circuit has the effect of condensive admittance in the supply circuit;

(c) As the receiving circuit impedance is increased, the supply-circuit admittance is also increased.

Mathematically stated, the theory of this type of system is as follows, reference being had particularly to Fig. 1 of the drawing:

$Ip$ = primary current.
$Is$ = secondary current.
$jwL$ is reactance of both windings AE+FD and CF+EB and $jwM$ is the mutual reactance between AE+FD and CF+EB.

Therefore, if $Zo$ is the load impedance, $$Ep = \left(jwL - \frac{j}{wC}\right) Ip + \frac{j}{wC} \cdot Is + jwMIs \quad (1);$$

$$0 = ZoIs + \left(jwL - \frac{j}{wC}\right) Is + \left(\frac{j}{wC} + jwM\right) Ip \quad (2).$$

Since $jwL - \frac{j}{wC} = 0$ on account of resonance, from (1), $$Is = \frac{Ep}{jwM + \frac{j}{wC}} \quad (3)$$

and from (2)

$$Ip = \frac{Zo}{jwM + \frac{j}{wC}} Is \quad (4)$$

and, therefore, $$Ip = \left(\frac{Zo}{wM + \frac{i}{wC}}\right)^2 \frac{E}{Zo} \quad \text{-----(5)}$$

Therefore, the effective impedance of the supply circuit is condensive when that of the receiving circuit is inductive, and vice versa.

Since the reactance of the movable coils in the corresponding circuit varies in accordance with the position thereof on the transformer core, the addition of a small variable reactor, such as 12 in Fig. 3, in circuit with the supply conductor 1, may be found to be advantageous.

It will be seen that I have thus provided a relatively simple system for effecting a tranformation of electrical energy from a constant potential to a constant current, the value of such current being readily varied by shifting the position of one set of coils with respect to another to vary the mutual inductance thereof without changing the self-inductance of the movable coils.

I do not wish to be restricted to the specific circuit connections, structural details or arrangement of parts herein set forth, as various modifications thereof may be made without departing from the spirit and scope of my invention. I desire, therefore, that only such limitations shall be imposed as are indicated in the appended claims.

I claim as my invention:

1. The combination with a supply circuit and a receiving circuit, of means for converting electrical energy from a constant potential in said supply circuit to a constant current in said receiving circuit, said means comprising a plurality of inductively related inductive devices, a condensive device associated therewith and means for varying the mutual inductance of said inductive devices while maintaining the self-inductance thereof substantially constant.

2. The combination with a supply circuit and a receiving circuit, of means for converting electrical energy from a constant potential in said supply circuit to a constant current in said receiving circuit, said means comprising a plurality of inductively related inductive devices, a condensive device connected to said inductive devices and means for movably mounting one inductive device with respect to another to vary the mutual inductance thereof.

3. The combination with a supply circuit and a receiving circuit, of means for converting electrical energy from a constant potential in said supply circuit to a constant current in said receiving circuit, said means comprising a plurality of inductively related inductive devices, a condensive device connected to said inductive devices to constitute a resonant circuit and means for varying the mutual inductance of said inductive devices.

4. The combination with a supply circuit and a receiving circuit, of means for converting electrical energy from a constant potential in said supply circuit to constant current in said receiving circuit, said means comprising a plurality of inductively related inductive devices, a condensive device associated therewith to constitute a resonant circuit, and means for movably mounting one inductive device with respect to another to vary the mutual inductance thereof while maintaining the self-inductance thereof substantially constant.

5. The combination with a supply circuit and a receiving circuit, of means for converting electrical energy from a constant potential in said supply circuit to a constant current in said receiving circuit, said means comprising a plurality of inductively related inductive devices, a condensive device connected to said inductive devices, and means for varying the current in said receiving circuit by varying the mutual inductance of said inductive devices.

6. The combination with a supply circuit and a receiving circuit, of means for converting electrical energy from a constant potential in said supply circuit to a constant current in said receiving circuit, said means comprising a plurality of inductively related inductive devices, a condensive device associated therewith to constitute a resonant circuit and means for varying the current in said receiving circuit by varying the mutual inductance of said inductive devices while maintaining the self-inductance thereof substantially constant.

7. The combination with a plurality of supply-circuit conductors, of a plurality of inductively related inductive devices in circuit with the respective conductors and a condensive device connected to intermediate points of said inductive devices, and means for varying the mutual inductance of said inductive devices.

8. The combination with a plurality of supply-circuit conductors, of a plurality of inductively related inductive devices in circuit with the respective conductors and a condensive device connected to intermediate points of said inductive devices to constitute a resonant circuit with certain parts thereof, and means for movably mounting one of said inductive devices with respect to another to vary the mutual inductance thereof.

9. The combination with a plurality of supply-circuit conductors, of a plurality of inductively related symmetrical reactor coils, a common core therefor, a condenser connected to the mid-points of said reactor coils and adapted to constitute a resonant circuit with one-half of each coil, and means for movably mounting one of said coils with respect to another to vary the mutual inductance thereof.

10. The combination with a plurality of supply-circuit conductors and a receiving circuit, of a plurality of inductive coils and a condenser connected across said supply circuit, a plurality of other coils electrically connected to and inductively interlinked with the first-named coils and connected across the receiving circuit, and means for varying the mutual inductance of the sets of coils.

11. The combination with a plurality of supply-circuit conductors and a receiving circuit, of a plurality of inductive coils and a condenser connected across said supply circuit to constitute a resonant circuit, a plurality of other coils electrically connected to and inductively interlinked with the first-named coils and connected across the receiving circuit, and means for movably mounting one of the sets of coils with respect to another.

In testimony whereof, I have hereunto subscribed my name this 25th day of August 1921.

CHARLES LE G. FORTESCUE.